Nov. 22, 1932.　　　J. A. BERDAN　　　1,888,370
WINDSHIELD WIPER ATTACHMENT
Filed Feb. 16, 1932
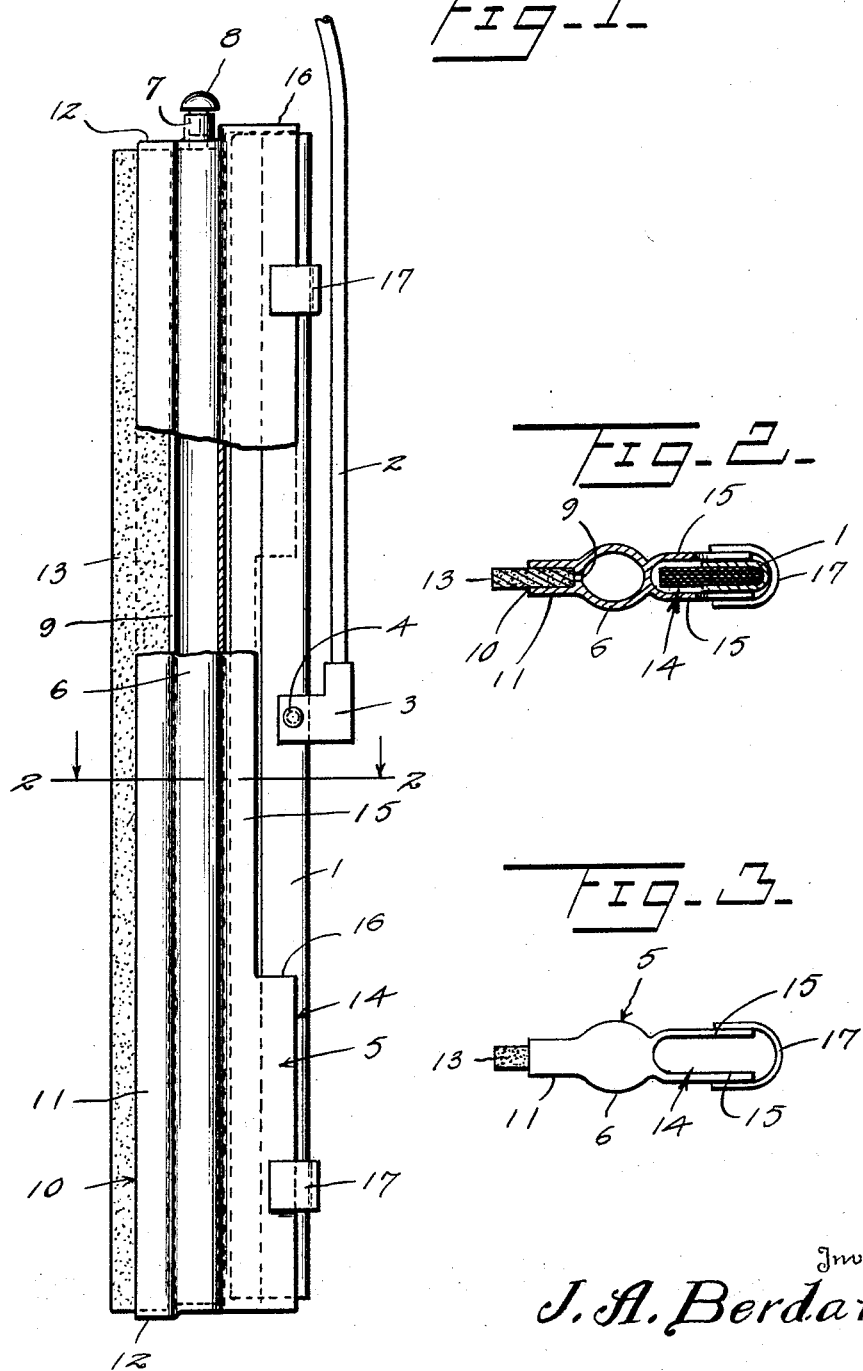
Inventor
J. A. Berdan
By Watson E. Coleman
Attorney Patented Nov. 22, 1932

1,888,370

UNITED STATES PATENT OFFICE

JACOB A. BERDAN, OF PORT HURON, MICHIGAN

WINDSHIELD WIPER ATTACHMENT

Application filed February 16, 1932. Serial No. 593,343.

This invention relates to attachments for windshield wipers for motor vehicles and pertains particularly to an attachment which is designed to apply frost preventing devices to the windshield.

The primary object of the present invention is to provide a windshield wiper attachment for applying anti-freeze solutions to the windshield, which is designed to be readily mounted upon the regular wiper to be carried thereby and to operate upon the windshield in place thereof.

Another object of the invention is to provide an attachment of the above described character which may be readily applied to the windshield wiper and held in operative engagement therewith without the use of screws, bolts or other removable securing elements.

Other objects and advantages of the invention will become apparent as the description of the same proceeds and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the attachment embodying the present invention showing the same applied to a windshield wiper, a portion of the attachment being broken away for the illustration of a portion of the interior thereof;

Figure 2 is a transverse sectional view taken on the line 2—2 of Figure 1;

Figure 3 is a plan view of the lower end of the attachment.

Referring now more particularly to the drawing wherein like numerals of reference indicate corresponding parts throughout the several views, the numeral 1 indicates generally a windshield wiper of the usual conventional type which is supported in operative position by the rod 2 through the medium of a clevis 3 which is carried upon the lower end of the rod 2 and which receives the back of the wiper and which is attached thereto in the manner shown, by a bolt or screw 4.

The attachment embodying the present invention comprises a single unit which is indicated as a whole by the numeral 5 and which consists of an elongated tubular receptacle 6 having an inlet opening 7 at its upper end which is normally closed by a plug 8. A wall of this receptacle 6 is provided with a longitudinally extending outlet 9 which is in the form of a very narrow slit and this slit opens into a channel 10 which is formed integral with the receptacle wall and which extends throughout the length of the receptacle and has the side wall portion 11 and the end walls 12.

Firmly secured in the channel 10 and extending throughout the length thereof and further projecting a substantial distance forwardly from the open side thereof is a felt wiper 13, the inner edge of which covers the slit 9 which opens into the receptacle 6.

At the side of the receptacle opposite the channel 10 there is formed integral therewith a second channel which is indicated generally by the numeral 14 and which opens in the opposite direction from the channel 10 and has the side walls 15 and the top end wall 16, the lower end of the channel 14 is open. Intermediate its ends the side walls of the channel 14 are cut out as indicated at 16 and for the purpose herein described.

Extending across the channel 14 at points upon either side of the transverse center thereof are loops 17 which maintain the wiper 1 in place in the second mentioned channel 14 as is also herein described.

In the use of the present windshield wiper attachment the same is applied to or mounted directly on the wiper but without disconnecting the same from its supporting arm or in any way altering the regular wiper structure, by holding the wiper element 1 away from the windshield and then inserting the lower end thereof into the channel 14 above the loop 17 which is nearest the open end of the channel. The device 5 is then moved vertically along the wiper 1 until the upper loop 17 is in a position above the upper end of the wiper 1 whereupon the upper end of this wiper is then moved into position in the channel 14 and the device 5 allowed to slide back down on the wiper 1 into the position illustrated in Figure 1. With the device 5 thus mounted on the original windshield wiper the felt portion 13 will position against the windshield glass and will have transferred thereto the glycerine or other liquid which the receptacle 6 contains.

It will, of course, be readily understood that the anti-freeze solution or any other suitable liquid or substance which will prevent the congelation of moisture on the vehicle windshield, such for example as glycerine, will pass through the slot 9 of the receptacle 6 into the channel 10 and saturate the felt wiper 13 from which, as previously stated, it will be transferred to the surface of the windshield glass.

It will be apparent from the foregoing that the herein described device may be easily and quickly applied to or removed from the regular windshield wiper without making any alterations therein or removing any of the parts thereof.

Having thus described the invention, what is claimed is:—

1. In a device designed for attachment to a windshield wiper having a supporting bar attached thereto midway of the ends of the wiper, for applying frost preventing liquid to an adjacent motor vehicle windshield, an elongated receptacle, a wiper carried by the receptacle, the receptacle being designed to discharge liquid therefrom onto the wiper, and means for attaching the receptacle to a windshield wiper to extend longitudinally thereof, comprising a channel formed longitudinally of the receptacle into which the windshield wiper is adapted to fit, said channel being closed at one end only, and a pair of yoke members disposed across and secured to the channel at points thereon spaced from the adjacent ends of the windshield wiper, when the same is in the channel, a distance less than the distance from the members to the point of connection of said bar with the windshield wiper, said yokes operating to prevent the accidental removal of the windshield wiper from the channel, the said closed end of the channel resting upon the upper end of the windshield wiper.

2. An attachment for a motor vehicle windshield wiper having a supporting bar attached thereto midway of the ends of the wiper, comprising a tubular receptacle, a wiper element carried by and extending lengthwise of the tubular receptacle, means for transferring liquid from the interior of the receptacle to the wiper element, a channel formed integral with the receptacle and open throughout its length, a wall closing one end of the channel, said channel having its sides open through an area located midway between its ends, and a loop member secured to and disposed across the channel between each end and the said open areas, said channel being designed to receive beneath the loops the windshield wiper with the end wall of the channel disposed upon the upper end of the said windshield wiper, the said loops, when the wiper is in the channel, being a shorter distance from the ends of the wiper than from the point of connection of said bar therewith.

In testimony whereof I hereunto affix my signature.

JACOB A. BERDAN.